United States Patent [19]
Biller

[11] Patent Number: 5,904,132
[45] Date of Patent: May 18, 1999

[54] SPEAR FISHING GUN

[75] Inventor: Alfred B. Biller, Bloomingdale, Ill.

[73] Assignee: The A B Biller Company, Bloomingdale, Ill.

[21] Appl. No.: 08/729,040

[22] Filed: Oct. 10, 1996

[51] Int. Cl.[6] .................................................. F41B 7/04
[52] U.S. Cl. .............................. 124/22; 124/20.3; 124/31
[58] Field of Search ................................ 42/1.14, 70.06, 42/70.04, 71.02, 71.01, 75.03, 72; 124/20.1, 20.3, 22, 31, 35.1, 40, 20.2, 17, 21, 18

[56] References Cited

U.S. PATENT DOCUMENTS

| | | | |
|---|---|---|---|
| 2,387,669 | 10/1945 | Loomis | 42/70.06 |
| 3,262,441 | 7/1966 | Senne | 124/22 |
| 3,269,046 | 8/1966 | Schaefer | 42/70.06 |
| 3,340,642 | 9/1967 | Vasiljevic | 43/6 |
| 3,585,979 | 6/1971 | Hendricks | 124/22 |
| 3,872,853 | 3/1975 | Nakatani | 124/22 |
| 4,151,670 | 5/1979 | Rath | 42/70.06 |
| 4,193,386 | 3/1980 | Rossi | 124/22 |
| 4,318,389 | 3/1982 | Kiss, Jr. | 124/22 |
| 4,359,999 | 11/1982 | Garofolo | 124/80 |
| 4,742,775 | 5/1988 | Harris | 102/456 |
| 4,894,940 | 1/1990 | Frain et al. | 42/103 |
| 4,895,128 | 1/1990 | Okada | 124/22 |
| 4,962,747 | 10/1990 | Biller | 124/40 |
| 5,363,833 | 11/1994 | Messud | 124/26 |
| 5,465,517 | 11/1995 | Garofalo | 42/70.06 |
| 5,595,166 | 1/1997 | Schmidt, III et al. | 124/22 |

FOREIGN PATENT DOCUMENTS

185240  7/1966  U.S.S.R. .................. 42/1.14

*Primary Examiner*—Charles T. Jordan
*Assistant Examiner*—Christopher K. Montgomery
*Attorney, Agent, or Firm*—Dillis V. Allen, Esq.

[57] ABSTRACT

A spear fishing gun having a receiver assembly that has a grip housing containing a removable trigger assembly with a spear point shaft latch bar, a trigger, and a safety pawl mounted on a shaft extending through the trigger assembly and the grip housing with an external operator, with the shaft being supported in the grip housing in a manner to increase its stability. The grip housing has a line holding and release assembly that is automatically tensioned as it is assembled to the grip housing, and a muzzle assembly is provided that permits the lateral insertion and removal of the spearpoint shaft.

14 Claims, 4 Drawing Sheets

SPEAR FISHING GUN

BACKGROUND OF THE INVENTION

Fishing spearguns have not changed dramatically over the last century in that they continue to enjoy spearpoint shafts that are biased into a trigger release mechanism by a plurality of rubber bands, and a string line is provided for retrieving the spearpoint and shaft after firing.

Of course, modern manufacturing techniques have made improvements which have somewhat affected the appearance of the speargun, its safety and ease of cocking and trigger pull. For example, the grip assembly now includes, in one case, a one-piece plastic housing that forms the handle grip, the trigger guard, the butt support, the forepiece support and the housing for the trigger assembly.

The trigger assembly has been improved by providing it with a removable frame that permits the trigger assembly to be easily removed from the grip housing. This prior trigger assembly includes a one-piece plastic frame having an upper spearpoint shaft guide and spaced parallel lower frames that pivotally support both the trigger and a shaft latching bar.

The trigger assembly is also provided with a safety pawl operated by a knob on the outside of the grip housing.

Since these spearguns have remained basically unchanged, performance improvements, although they may appear small, contribute greatly to the popularity of the speargun in this fascinating, competitive and still somewhat esoteric sport.

In these prior trigger assemblies, the latch bar and the trigger slidably engage one another and are constructed of the same material and after a period of use, the interengaging surfaces become scored causing trigger pull to become erratic which results in a jerking movement of the gun during firing throwing the spear off target.

Another problem in these prior trigger assemblies is that the safety mechanism requires the use of the fisherman's other hand, or more particularly, with the fisherman's left hand on the grip housing handle, he either has to operate the safety release with his right hand or take his left hand off the grip to release it.

In my U.S. Pat. No. 4,962,747, issued Oct. 16, 1990, I disclose and describe a speargun that includes a trigger assembly that has a left-right reversible safety operable with the trigger hand while on the grip, and an improved trigger pull achieved by engaging bearing surfaces on the latch bar and trigger.

That speargun was provided with a one-piece grip housing in the general shape of the housing of an automatic pistol that has an upper slot into which a trigger assembly is insertable. The trigger assembly has a plastic frame with an integral top tube that receives the proximal end of the spearpoint shaft, and parallel spaced depending walls that pivotally support the trigger, the latch bar, and a safety pawl.

The latch bar has an upwardly projecting shaft locking pawl substantially in line with the pivotal axis of the locking pawl, and this location has the effect of reducing the outward shaft torque on the latch bar, and hence the trigger, reducing trigger pull effort by at least 32%.

The latch bar has an elongated arm that rests on a shoulder on the trigger in the set or firing position. The latch bar is constructed of hardened 17-7 stainless steel, while the trigger is constructed of 302 stainless, or equivalents thereof, resulting in a significant difference in hardness and creating a bearing effect between the latch bar arm and the trigger shoulder eliminating the prior problem of scoring on these surfaces and thereby smoothing out trigger pull substantially.

The safety pawl is operated by a knob and shaft assembly projecting through the grip housing and the trigger frame. The knob has a radially extending finger that is positioned so that when the safety is "on" with the latch bar holding the spearpoint shaft in a firing position, this finger depends over the trigger blocking movement of the fisherman's index finger toward the trigger. This is important in spearguns because underwater conditions make it difficult to visually observe whether the safety is "on" or "off".

After recognizing a safety "on" condition, the fisherman, with his trigger hand on the housing grip, releases the safety with this index finger of his trigger hand by rotating the knob finger clockwise toward a horizontal position away from the trigger, rotating the safety pawl away from the trigger creating a firing condition.

The safety knob and shaft assembly is insertable through the safety pawl from either the right or left side of the grip housing permitting the safety to be used with the trigger hand on the grip for both right or left side spear fishermen.

While my prior speargun has worked well and been extremely successful, it does have several disadvantages that are addressed in the design of the speargun according to the present invention.

Firstly, the safety assembly is journaled in the frame of the removable trigger assembly, and since the width of the frame is fairly narrow, the shaft supporting the safety assembly tends to rock somewhat during use, creating a feeling of uncertainty in operation. And oxidation caused by salt water and foreign matter in my prior gun had a deleterious effect on the metal bearings. This prior safety assembly also includes a spring for urging the safety assembly to its appropriate axial position. The spring is mounted externally of the grip housing, which requires the safety assembly shaft to project a significant distance from the grip housing. This design has resulted in some cases in the safety assembly shaft bending which sometimes prompts the spear fisherman to completely remove the safety assembly.

My prior speargun also included a line holding and release assembly mounted in the grip housing that included a shaft with an hexagonal head, a torsion spring, and a finger bar. The torsion spring was seated at one end in the hexagonal shaft head, and the other end seated in the line holding finger bar. As these parts are assembled to the grip housing, it was necessary to rotate the hexagonal head to tension the spring prior to pushing the head into a mating hexagonal hole in the grip housing. This was an extremely difficult assembly procedure that required repetitive attempts to locate the parts properly and at the same time rotate the head to tension the finger bar. Also in this design the spring was carried by the shaft inside the housing, without any support during initial assembly, and tended to push the shaft out of the housing sometimes causing these parts to be lost.

The third problem with my prior speargun, as well as all of the spearguns that I am aware of, is the necessity for the spearpoint shaft to be threaded completely through the muzzle both when loading the spearpoint shaft and when removing the spearpoint shaft from the gun after an incomplete fire when the spearpoint shaft fails to clear the muzzle.

It is a primary object of the present invention to ameliorate these problems noted above both in the prior art and in my prior speargun, as shown and described in my U.S. Pat. No. 4,962,747, issued Oct. 16, 1990.

SUMMARY OF THE PRESENT INVENTION

In accordance with the present invention, an improved spear fishing gun is provided having a receiver assembly that has a grip housing containing a removable trigger assembly with a spearpoint shaft latch bar, trigger, and a safety pawl, the latter mounted on a shaft extending through the grip housing with an external operator, with the shaft being supported in the grip housing to increase its stability. The grip housing has a line holding and release assembly that is automatically tensioned as it is assembled to the grip housing, and a muzzle assembly is provided that permits the lateral insertion and removal of the spearpoint shaft.

Toward these ends, the safety pawl assembly includes a square pivot shaft that is supported by plastic bearings in the grip housing, rather than in the trigger assembly frame. Since the walls of the grip housing are spaced apart a far greater distance than the corresponding walls in the trigger assembly frame, the entire safety assembly has far greater stability than in my prior construction. The bearings for this safety shaft include a boss integrally formed on the safety assembly operator that fits closely in an aperture in the grip housing. The other end of the safety assembly shaft is supported in the other side of the grip housing by a small annular plastic bearing that is engaged in an aperture therein. This reduces the oxidation problems in my prior gun.

A spring is provided on the shaft inside the grip housing for urging the shaft and the operator to their appropriate positions. This eliminates the need for a long extension of the shaft from the grip housing as in my prior speargun described in my U.S. Pat. No. 4,962,747.

The line holding and release assembly includes a main support shaft for a pivotal finger bar and a coil spring. One end of the coil spring is held in a fixed position relative to the grip housing by a small offset pin, and the other end of the spring is bent laterally and is received in an offset aperture in the finger bar. During assembly the spring is positioned first in the grip housing over the small pin, and the other end is threaded into the finger bar aperture before the main shaft is threaded through the finger bar. When the main shaft is then threaded through the finger bar, the finger bar is automatically appropriately tensioned in the grip housing without requiring any additional tensioning as in prior designs.

The muzzle assembly is a one-piece plastic molding that has a band aperture and an integral line holding finger. The top of this molding has a spearpoint shaft receiving opening that has an adjacent lateral slot formed by deformable fingers that permit the spearpoint shaft to be laterally snapped in and out of the muzzle, thereby eliminating the prior necessity of completely threading the spearpoint shaft through the muzzle both when loading the spearpoint shaft and when removing the shaft from the gun after a misfire.

A further feature of the present invention is the provision of a knuckle guard which not only achieves the function of protecting the fisherman's knuckles from injury, but also keeps the grip housing from spreading near the line holding and release assembly, thereby eliminating the problem of the line holding and release assembly parts becoming disoriented.

Other objects and advantages of the present invention will appear more clearly from the following detailed description.

DETAILED DESCRIPTION OF THE PREFERRED EMBODIMENT

Figure 1:
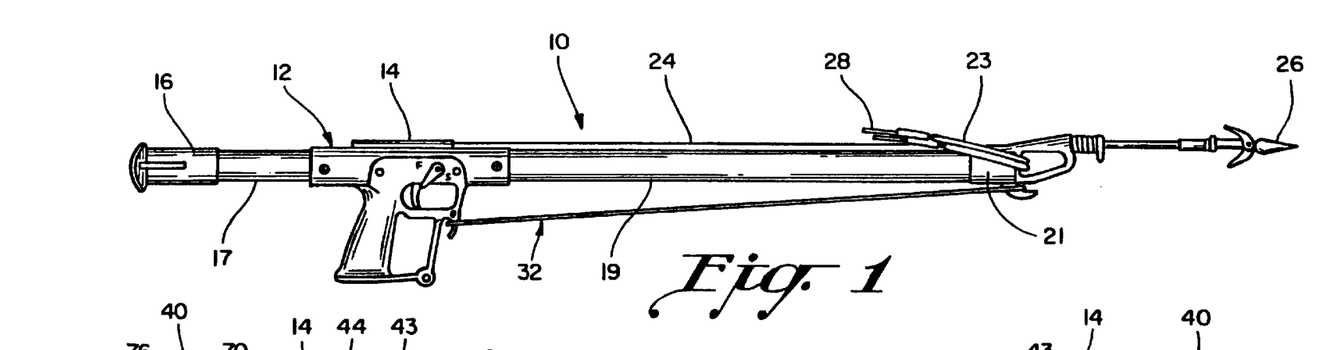
FIG. 1 is a side view of the fishing speargun according to the present invention.
Figure 2:
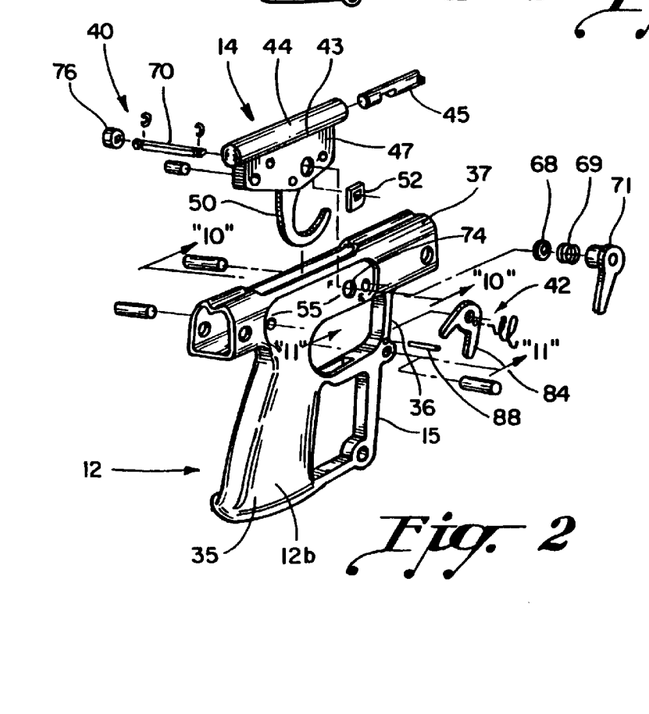
FIG. 2 is an exploded sub-assembly perspective of the grip housing, trigger assembly, and line assembly shown in FIG. 1.
Figure 3:
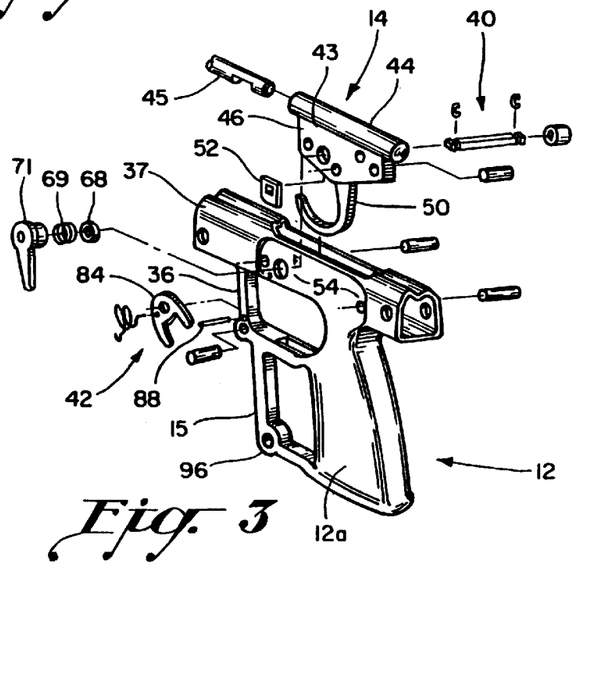
FIG. 3 is a left side exploded perspective similar to FIG. 2.

Referring to the drawings and particularly FIGS. 1 to 3, a speargun assembly 10 is illustrated according to the present invention generally including a grip housing 12, a trigger assembly 14, a butt rest 16 supported in grip housing 12 by butt extension 17, a wooden forepiece 19 supported in the forward end of grip housing 12, a muzzle piece 21 supported on forepiece 19, and a pair of bands 23 of natural rubber shown in their relaxed positions which are adapted to engage spearpoint shaft 24 in preparation for firing, which carries a spearpoint 26 at its distal end.

Figure 4:
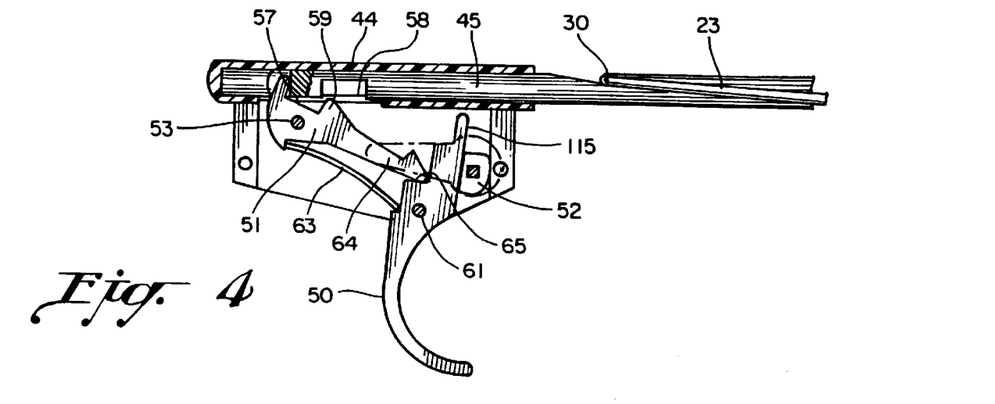
FIGS. 4, 5 and 6 are longitudinal sections of the trigger assembly respectively in the loading, safety "on" and firing positions.

Bands 23 carry metal loops 28 adapted to engage in grooves 30 in the top of spearpoint shaft 24 as seen clearly in FIG. 4.

Referring again to FIG. 1, a line assembly 32 is provided for retrieving the spearpoint 26 and shaft after firing.

As seen in FIGS. 2 and 3, the grip housing 12 is a one-piece plastic molding including a clamshell design of two substantially mirror image half portions 12a and 12b in the general shape of an automatic pistol having a hollow handle 35, a trigger guard 36, and a tubular upper receiver 37, whose forward end supports forepiece 19 and rear end supports butt extension 17 and a knuckle guard 15. Trigger assembly 14 is insertable into an elongated slot 38 in the top of receiver 37.

The trigger assembly 14 and the grip housing 12 support a safety assembly 40 and a line holding and release assembly 42.

Figure 5:
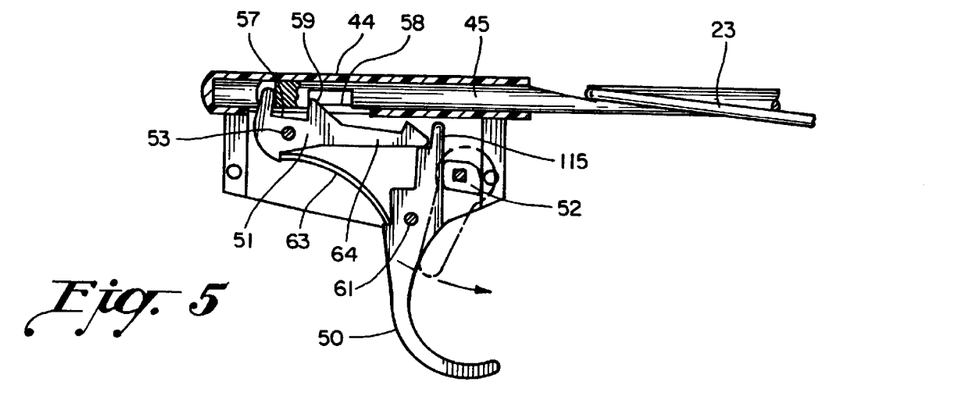
Figure 6:
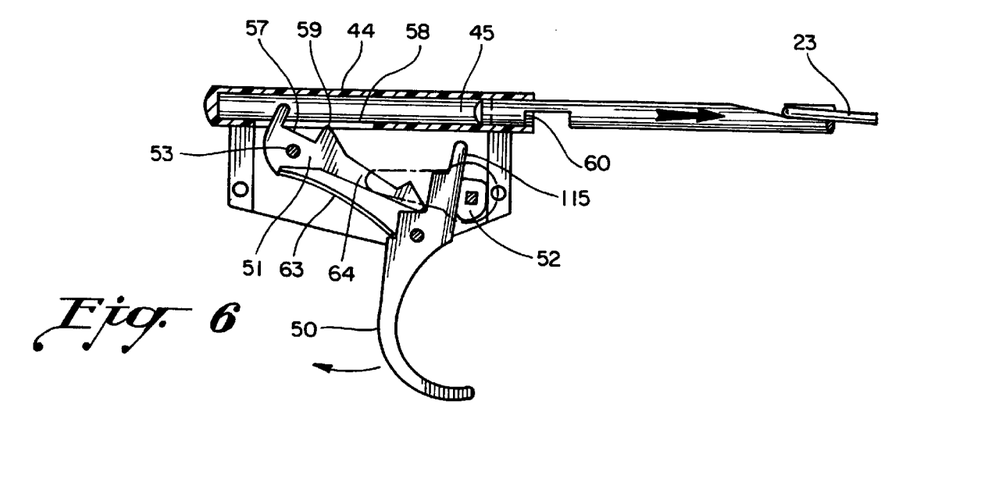

The trigger assembly 14 includes a reinforced nylon plastic frame 43 seen more clearly in FIGS. 4 to 6. Frame 43 is a one-piece plastic injection molding having an integral upper guide tube 44 that slidably receives proximal end 45 of spearpoint shaft 24. Frame 43 has a pair of parallel spaced depending side walls 46 and 47 that laterally support trigger 50, latch bar 51, and safety pawl 52.

The latch bar 51 is a one-piece 17-7 hardened stainless steel part pivotally supported between walls 46 and 47 by a pin 53 that extends through walls 46 and 47 but not through receiver side walls 54 and 55, as seen in FIGS. 2 and 3 so that it does not have to be removed to remove trigger assembly 14 from receiver 37.

The latch bar 51 has a rectangular recess hat defines a reset pawl extending into guide tube 44 through slot 58. Pawl 57 is engaged by the proximal end 45 of the spearpoint shaft as the shaft is loaded into the guide tube 44.

Recess 57 also defines a second pawl 59 on the latch bar that in its set position illustrated in FIG. 5 engages a shoulder 60 in a recess in the bottom of spear-point shaft proximal end 45 to hold the spearpoint shaft in a firing reading position.

One-piece trigger 50 is constructed of 302 stainless steel and is pivotally mounted between trigger frame walls 46 and 47 by pin 61, and a leaf spring 63 is provided which engages shoulders on the latch bar and trigger to maintain them in engagement after firing as seen in FIG. 6.

The latch bar 51 has a forwardly extending arm 64 that engages a generally horizontal shoulder 65 on trigger 50 in the firing position of the latch bar illustrated in FIG. 5.

Because the latch bar 51 and the trigger 50 are constructed of substantially disparate hardness materials, the interengaging surfaces of shoulder 65 and the bottom surfaces of latch bar arm 64 create a bearing condition between the surfaces that substantially eliminates scoring of these surfaces and yields a vastly enhanced trigger pull.

As seen in FIGS. 2 and 3, a safety assembly 40 is provided that includes the pawl 52, spacing ring 68, spring 69, shaft 70 and operator knob 71.

The shaft 70 is square throughout its length and is received in a corresponding rectangular aperture in safety pawl 52 so that the pawl is rotationally fixed to the shaft.

Figure 10:
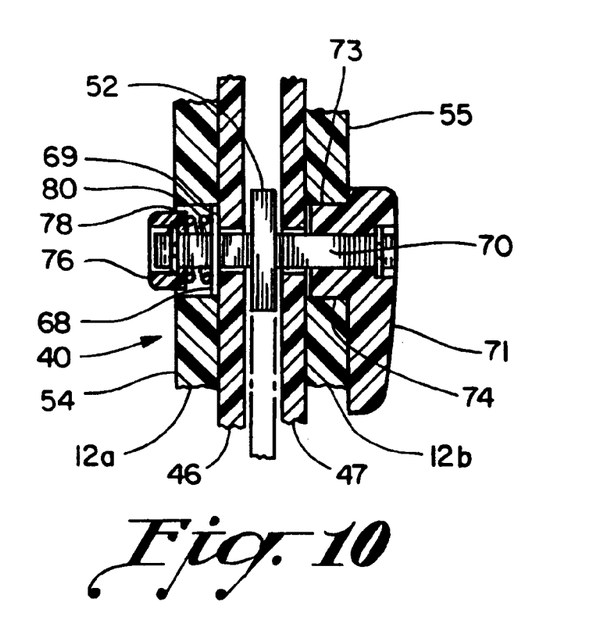
FIG. 10 is a cross section through the grip housing illustrating the safety assembly according to the present invention taken generally along line 10—10 of FIG. 2.

The operator knob 71, as seen in FIGS. 2, 3 and 10, has an integral tubular boss 73 with a rectangular aperture therein for non-rotatably receiving shaft 70, and boss 73 is seated in a circular aperture 74 in the grip housing side wall 55, that provides the appropriate bearing support (as assembled in FIG. 2), for the safety assembly 40. The opposite end of square shaft 70 receives a short plastic annular bearing segment 76 that has a square aperture therein that non-rotatably receives that end of shaft 70. Bearing or bushing 76, as seen in FIG. 10, is rotatably supported and received in aperture 78 in grip housing side wall 54 to provide the bearing support for the left side of the safety assembly 40. The wide spacing between bearing walls 54 and 55 provides greater stability for the shaft 70 and the trigger assembly 40. The trigger assembly is maintained in its appropriate axial position in the housing by a coil compression spring 80, which reacts between segment 76 and spacer 68 which engages the side of 46. This action also urges the operator knob 71 toward its seated position in the grip housing. This assembly eliminates the extension of shaft 70 from the grip housing.

Figure 11:
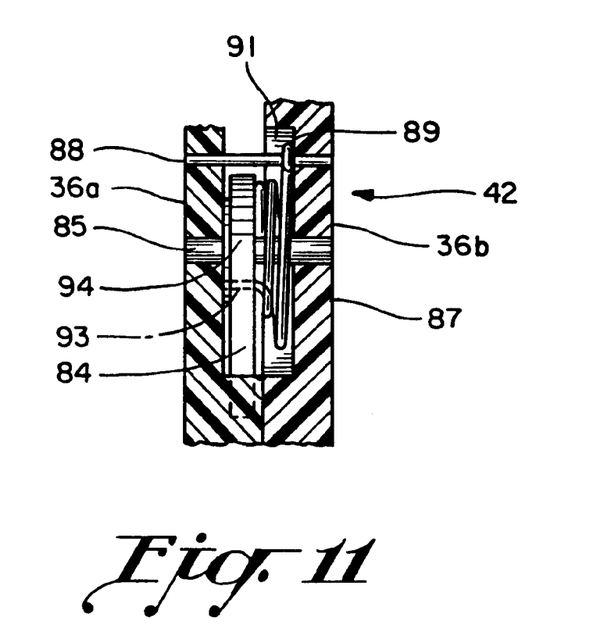
FIG. 11 is a cross section through the grip housing illustrating the line holding and release assembly taken generally along line 11—11 of FIG. 2.

As seen in FIG. 11, the line holding and release assembly 42 is mounted between the portions of the grip housings 12a and 12b of the one-piece housing defining the trigger guard 36, and these have been designated as 36a and 36b in FIG. 11. Holding and release assembly 42 includes a boomerang-shaped finger bar 84 pivotally mounted on a cross shaft 85 seated in aligned apertures in housing portions 36a and 36b, a coil compression spring 87, and a small diameter pin 88 also seated in apertures in side walls 36a and 36b. One end of coil spring 87 has a loop 89 that fits around pin 88 to fix one end of the spring 87 with respect to the housing. Spring 87 is seated within a chamber 91 formed in housing side wall 36b. The other end of spring 89 has a lateral projection 93 that fits within an offset aperture or hole in finger bar 84.

During assembly, spring 87 is assembled first by placing it into chamber 91 around pin 88 with main shaft 85 being unassembled at that point. Then the projection 87 is positioned in finger bar 84, and the finger bar is rotated to its holding position as the main shaft is inserted through central aperture 94 in bar 84. Side walls in chamber 91 and recesses in side wall 36a define the limiting positions for the finger bar 84 so that when shaft 85 is inserted through the bar 84, it is automatically preloaded by spring 87.

Figure 7:
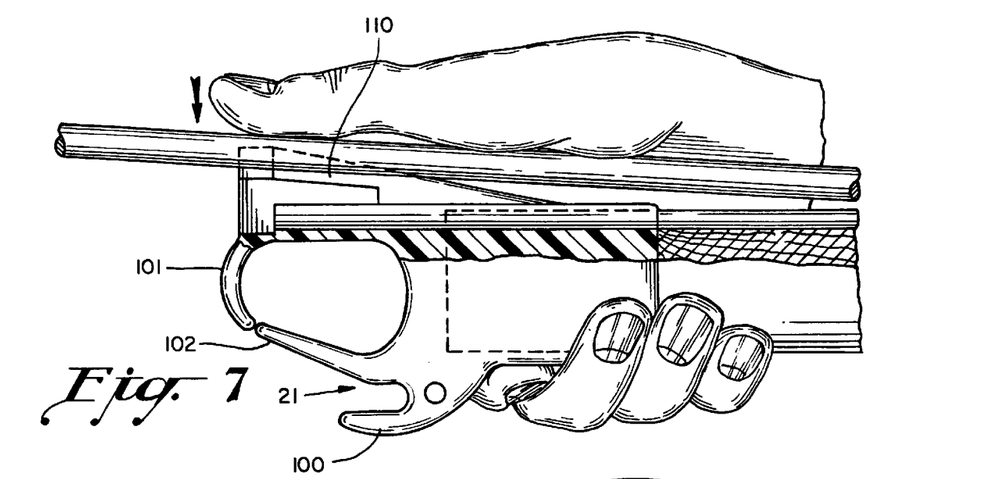
FIGS. 7 and 8 are a side views, partly fragmented, of the muzzle end of the present speargun according to the present invention as the spearpoint shaft is snapped into its loaded position.
Figure 8:
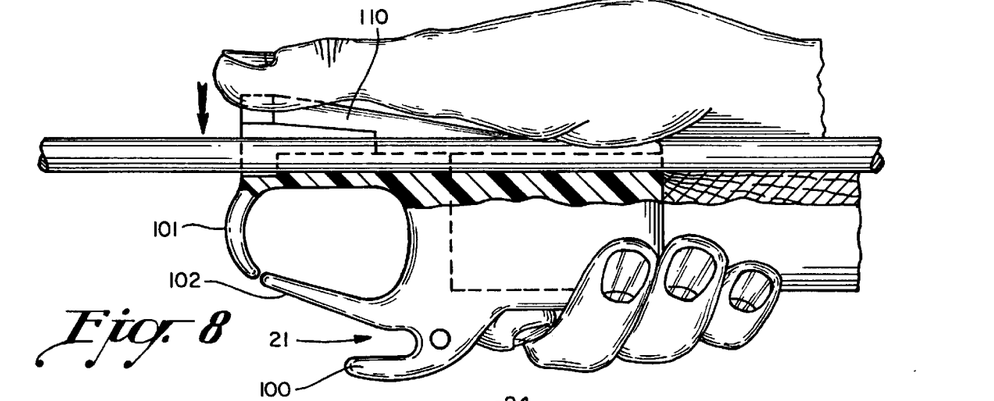
Figure 9:
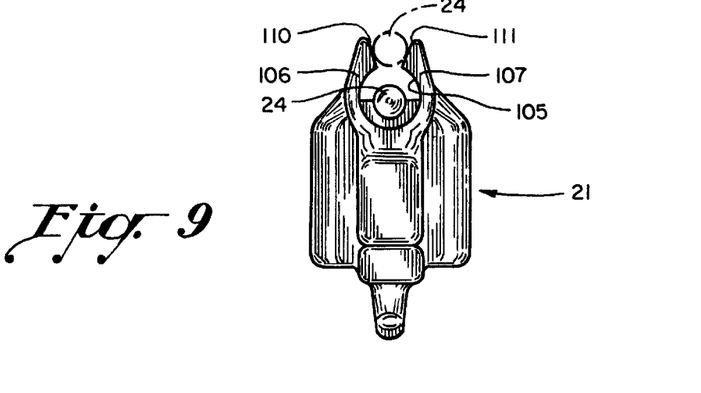
FIG. 9 is a left side end view of the muzzle assembly.

As seen in FIGS. 7, 8 and 9, the muzzle assembly 21 is a one-piece plastic molding that slides onto and is fastened over the distal end of forepiece 19. Muzzle 21 includes an integral forward line holding finger 100 and a band loop 101 that includes an integral spring finger 102 for permitting the fast and easy entry of the bands 29 into the loop without any separate parts.

The muzzle 21 has a circular axial aperture 105 therethrough that receives spearpoint shaft 24, defined by arcuate segments 106 and 107. The segments 106 and 107 are circumferentially spaced from one another permitting lateral entry of the spearpoint shaft 24. The arcuate segments 106 and 107 have inwardly radially converging shaft entry surfaces 110 and 111 that at their closest point are spaced from one another a distance less than the outer diameter of the spearpoint shaft 24. As seen in FIGS. 7 and 8, the surfaces 110 and 111 angle axially and rearwardly downwardly toward the forepiece 19 to accommodate the angular orientation of spearpoint shaft as it is inserted and removed from the muzzle.

This design permits the spearpoint shaft to be snapped into the muzzle aperture 105 by the application of radial pressure to the upper surface of the spearpoint shaft by the fisherman's thumb, bearing in mind that the muzzle is constructed of an appropriate plastic material so that arcuate segments 106 and 107 are slightly flexible to permit this snap action of the spearpoint shaft into and out of the muzzle. In the event of a misfiring of the spearpoint shaft from the speargun when the spearpoint shaft does not clear the muzzle, the shaft can be pulled away from the gun and snapped out of the muzzle laterally eliminating the necessity that it be axially cleared from the muzzle.

Referring to FIGS. 4, 5 and 6, spearpoint shaft 24 is loaded by inserting it into the guide tube 44 engaging the projection on latch 51, rotating latch bar 51 counter-clockwise against the biasing force of spring 63 away from transverse trigger shoulders permitting trigger 50 to pivot counter-clockwise to its position illustrated in FIG. 5 where a latch bar arm 64 engages transverse trigger shoulders stopping further counter-clockwise movement of the trigger 50. In this position of the latch bar 51, the pawl engages the shaft shoulder preventing outer movement of spearpoint shaft 24 from the guide tube 44.

With his trigger hand forefinger, the fisherman engages safety operator knob 71 and rotates it from its FIG. 4 position to its FIG. 5 "on" position where the safety pawl 52 engages trigger side 115 preventing trigger firing.

When commencing firing, the trigger hand forefinger again engages safety knob 71 and rotates it clockwise back to its horizontal position illustrated in FIG. 6, its "off" position permitting trigger 50 to be pulled to its fired position illustrated in FIG. 6 permitting latch bar 51 to pivot clockwise releasing the locking pawl from the shaft shoulder, permitting bands 23 to fire shaft 24 from the speargun.

I claim:

1. A grip assembly for a fishing speargun, comprising: a grip outer housing having a handle and spaced side walls, a trigger assembly having a frame with side walls removably received inside the grip housing side walls, said frame having guide means for receiving the proximal end of a spearpoint shaft, a trigger pivotally mounted in the trigger frame, a latch bar having a set position and a reset position engageable by the spearpoint shaft proximal end as the shaft is inserted into the frame guide means, said latch bar also having a pawl when in the set position engageable with the shaft proximal end for holding the shaft in a set position in the guide means against the force of firing bands pulling on the shaft, said trigger being selectively operable to hold the latch bar in its set position and to release the latch bar as the trigger is pulled, a pivotal safety pawl for selectively preventing movement of the latch bar from its set position, shaft means on which the safety pawl is non-rotatably mounted, said shaft means having an end projecting from the grip outer housing, widely spaced plastic bearings fixed to shaft means, a pivotal operator for the safety pawl fixed to the projecting end of the shaft means, and widely spaced plastic bearing means in the grip outer housing side walls for rotatably receiving the shaft means widely spaced bearings rather than in the trigger assembly to increase the stability of the shaft means, safety pawl and operator.

2. A grip assembly for a fishing speargun as defined in claim 1, wherein the operator has a tubular boss rotatably mounted in an aperture in the housing and forming at least a part of the bearing means fixed to the shaft means.

3. A grip assembly for a fishing speargun as defined in claim 1, wherein the bearing means fixed to the shaft means includes an annular bearing carried by the end of the shaft means opposite its projecting end and seated in an aperture in the grip outer housing.

4. A grip assembly for a fishing speargun, comprising: a grip outer housing having a handle and spaced side walls, a trigger assembly having a frame with side walls removably received inside the grip housing side walls, said frame having guide means for receiving the proximal end of a spearpoint shaft, a trigger pivotally mounted in the trigger frame, a latch bar having a set position and a reset position engageable by the spearpoint shaft proximal end as the shaft is inserted into the frame guide means, said latch bar also having a pawl when in the set position engageable with the shaft proximal end for holding the shaft in a set position in the guide means against the force of firing bands pulling on the shaft, said trigger being selectively operable to hold the latch bar in its set position and to release the latch bar as the trigger is pulled, a pivotal safety pawl for selectively preventing movement of the latch bar from its set position, shaft means on which the safety pawl is non-rotatably mounted, said shaft means having an end projecting from the grip outer housing, a pivotal operator for the safety pawl fixed to the projecting end of the shaft means, and bearing means in the grip outer housing for the shaft means to increase the stability of the shaft means, safety pawl and operator, said trigger assembly frame having a slot therein for receiving the safety pawl and holding it against axial movement, spring means on the shaft means reacting against the trigger assembly frame and the shaft means for urging the shaft means in a direction to urge the pivotal operator toward the grip outer housing.

5. A grip assembly for a fishing speargun, comprising: a grip outer housing having a handle and spaced side walls, a trigger assembly having a frame with side walls removably received inside the grip housing side walls, said frame having guide means for receiving the proximal end of a spearpoint shaft, a trigger pivotally mounted in the trigger frame, a latch bar having a set position and a reset position engageable by the spearpoint shaft proximal end as the shaft is inserted into the frame guide means, said latch bar also having a pawl when in the set position engageable with the shaft proximal end for holding the shaft in a set position in the guide means against the force of firing bands pulling on the shaft, said trigger being selectively operable to hold the latch bar in its set position and to release the latch bar as the trigger is pulled, a pivotal safety pawl for selectively preventing movement of the latch bar from its set position, shaft means on which the safety pawl is non-rotatably mounted, said shaft means having an end projecting from the grip outer housing, a pivotal operator for the safety pawl fixed to the projecting end of the shaft means, and bearing means in the grip outer housing for the shaft means to increase the stability of the shaft means, safety pawl and operator, said bearing means fixed to the shaft means including an annular bearing carried by the end of the shaft means opposite its projecting end and seated in an aperture in the grip outer housing and the operator has a tubular boss rotatably mounted in an aperture in the housing, said trigger assembly frame having a slot therein for receiving the safety pawl and holding it against axial movement, spring means on the shaft means reacting against the trigger assembly frame and the shaft means for urging the shaft means in a direction to urge the pivotal operator toward the grip outer housing.

6. A grip assembly for a fishing speargun as defined in claim 5, wherein said spring means reacts against the annular bearing.

7. A grip assembly for a fishing speargun, comprising: a grip outer housing having a handle and spaced side walls, a trigger assembly removably received in the outer grip housing with a frame, said frame having guide means for receiving the proximal end of a spearpoint shaft, a trigger pivotally mounted in the trigger frame, a latch bar having a set position and a reset position engageable by the spearpoint shaft proximal end as the shaft is inserted into the frame guide means, said latch bar also having a pawl when in the set position engageable with the shaft proximal end for holding the shaft in a set position in the guide means against the force of firing bands pulling on the shaft, said trigger being selectively operable to hold the latch bar in its set position and to release the latch bar as the trigger is pulled, a pivotal safety pawl for selectively preventing movement of the latch bar from its set position, shaft means on which the safety pawl is non-rotatably mounted, said shaft means having an end projecting from the grip outer housing, a pivotal operator for the safety pawl fixed to the projecting end of the shaft means, and bearing means in the grip outer housing for the shaft means to increase the stability of the shaft means, safety pawl and operator, wherein the bearing means includes an annular bearing carried by the end of the shaft means opposite its projecting end and seated in an aperture in the grip outer housing, and the operator has a tubular boss rotatably mounted in an aperture in the housing, said trigger assembly frame having a slot therein for receiving the safety pawl and holding it against axial movement, spring means on the shaft means reacting against the trigger assembly frame and the shaft means for urging the shaft means in a direction to urge the pivotal operator toward the grip outer housing, said spring means reacting against the annular bearing.

8. A grip assembly for a fishing spear-gun comprising: a grip housing having a handle, a trigger assembly in the grip housing, guide means for receiving the proximal end of a spearpoint shaft, a line assembly for tethering the spearpoint shaft including a line holding and release assembly carried by the grip housing including a line holding finger bar pivotally mounted in the grip housing between a line holding position and a line release position, shaft means in the housing pivotally supporting the finger bar in the grip housing, and spring means urging the finger bar toward the line holding position, and means mounting the spring means in the grip housing so the finger bar is automatically tensioned as the finger bar and shaft means are mounted in the grip housing including a projection in the housing for holding one end of the spring means and tensioning the finger bar as the bar is rotated to its line holding position prior to insertion of the shaft during assembly.

9. A grip assembly for a fishing speargun, comprising: a grip housing having a handle, a trigger assembly in the grip housing, guide means for receiving the proximal end of a spearpoint shaft, a line assembly for tethering the spearpoint shaft including a line holding and release assembly carried by the grip housing including a line holding finger bar pivotally mounted in the grip housing between a line holding position and a line release position, shaft means in the housing pivotally supporting the finger bar in the grip housing, and a spring urging the finger bar toward the line holding position, and means mounting the spring means in the grip housing so the finger bar is automatically tensioned as the finger bar and shaft means are mounted in the grip housing, said means for automatically tensioning the finger bar includes a projection fixed in the grip housing for holding one end of the spring means fixed with respect to the grip housing, and an aperture in the finger bar for receiving the other end of the spring, whereby the spring is assembled first in the housing and the finger bar is connected to the spring before the shaft means is fully seated in the grip housing and when fully seated the finger bar is appropriately tensioned.

10. A grip assembly for a fishing speargun as defined in claim 9, wherein the projection in the grip housing for holding one end of the spring means includes a small pin in the grip housing.

11. A grip assembly for a fishing speargun, comprising: a grip housing having a handle, a trigger assembly in the grip housing, guide means for receiving the proximal end of a spearpoint shaft, a line assembly for tethering the spearpoint shaft including a line holding and release assembly carried by the grip housing including a line holding finger bar pivotally mounted in the grip housing between a line holding position and a line release position, shaft means in the housing pivotally supporting the finger bar in the grip housing, and a spring urging the finger bar toward the line holding position, and means mounting the spring means in the grip housing so the finger bar is automatically tensioned as the finger bar and shaft means are mounted in the grip housing, wherein the means for automatically tensioning the finger bar includes a projection fixed in the grip housing for holding one end of the spring means fixed with respect to the grip housing, and an aperture in the finger bar for receiving the other end of the spring, whereby the spring is assembled first in the housing and the finger bar is connected to the spring before the shaft means is fully seated in the grip housing and when fully seated the finger bar is appropriately tensioned, wherein the projection in the grip housing for holding one end of the spring means includes a small pin in the grip housing.

12. A grip assembly for a fishing speargun, comprising: a grip outer housing having a handle and spaced side walls, a trigger assembly having a frame with side walls removably received in the grip outer housing side walls, said frame having guide means for receiving the proximal end of a spearpoint shaft, a trigger pivotally mounted in the trigger frame, a latch bar having a set position and a reset position engageable by the spearpoint shaft proximal end as the shaft is inserted into the frame guide means, said latch bar also having a pawl when in the set position engageable with the shaft proximal end for holding the shaft in a set position in the guide means against the force of firing bands pulling on the shaft, said trigger being selectively operable to hold the latch bar in its set position and to release the latch bar as the trigger is pulled, a pivotal safety pawl for selectively preventing movement of the latch bar from its set position, shaft means on which the safety pawl is non-rotatably mounted, said shaft means having an end projecting from the grip outer housing, a pivotal operator for the safety pawl fixed to the projecting end of the shaft means, and bearing means in the grip outer housing for the shaft means to increase the stability of the shaft means, safety pawl and operator, a line assembly for tethering the spearpoint shaft including a line holding and release assembly carried by the grip housing including a line holding finger bar pivotally mounted in the grip housing between a line holding position and a line release position, shaft means in the housing pivotally supporting the finger bar in the grip housing, and a spring urging the finger bar toward the line holding position, and means mounting the spring means in the grip housing so the finger bar is automatically tensioned as the finger bar and shaft means are mounted in the grip housing.

13. A grip assembly for a fishing speargun, comprising: a grip outer housing having a handle and spaced side walls, a trigger assembly having a frame with side walls removably received in the grip outer housing side walls, said frame having guide means for receiving the proximal end of a spearpoint shaft, a trigger pivotally mounted in the trigger frame, a latch bar having a set position and a reset position engageable by the spearpoint shaft proximal end as the shaft is inserted into the frame guide means, said latch bar also having a pawl when in the set position engageable with the shaft proximal end for holding the shaft in a set position in the guide means against the force of firing bands pulling on the shaft, said trigger being selectively operable to hold the latch bar in its set position and to release the latch bar as the trigger is pulled, a pivotal safety pawl for selectively preventing movement of the latch bar from its set position, shaft means on which the safety pawl is non-rotatably mounted, said shaft means having an end projecting from the grip outer housing, a pivotal operator for the safety pawl fixed to the projecting end of the shaft means, and bearing means in the grip outer housing for the shaft means to increase the stability of the shaft means, safety pawl and operator, a muzzle assembly for receiving and supporting the distal end of the spearpoint shaft, and means in the muzzle assembly to permit the lateral insertion and removal of the spearpoint shaft to eliminate the need for threading the spearpoint shaft completely through the muzzle assembly.

14. A grip assembly for a fishing speargun, comprising: a grip outer housing having a handle and spaced side walls, a trigger assembly having a frame with side walls removably received in the grip housing side walls, said frame having guide means for receiving the proximal end of a spearpoint shaft, a trigger pivotally mounted in the trigger frame, a latch bar having a set position and a reset position engageable by the spearpoint shaft proximal end as the shaft is inserted into the frame guide means, said latch bar also having a pawl when in the set position engageable with the shaft proximal end for holding the shaft in a set position in the guide means against the force of firing bands pulling on the shaft, said trigger being selectively operable to hold the latch bar in its set position and to release the latch bar as the trigger is pulled, a pivotal safety pawl for selectively preventing movement of the latch bar from its set position, shaft means on which the safety pawl is non-rotatably mounted, said shaft means having an end projecting from the grip outer housing, a pivotal operator for the safety pawl fixed to the projecting end of the shaft means, and bearing means in the grip outer housing for the shaft means to increase the stability of the shaft means, safety pawl and operator, a line assembly for tethering the spearpoint shaft including a line holding and release assembly carried by the grip housing including a line holding finger bar pivotally mounted in the grip housing between a line holding position and a line release position, shaft means in the housing pivotally supporting the finger bar in the grip housing, and a spring urging the finger bar toward the line holding position, and means mounting the spring means in the grip housing so the finger bar is automatically tensioned as the finger bar and shaft means are mounted in the grip housing, a muzzle assembly for receiving and supporting the distal end of the spearpoint shaft, and means in the muzzle assembly to permit the lateral insertion and removal of the spearpoint shaft to eliminate the need for threading the spearpoint shaft completely through the muzzle assembly.

* * * * *